Patented May 11, 1937

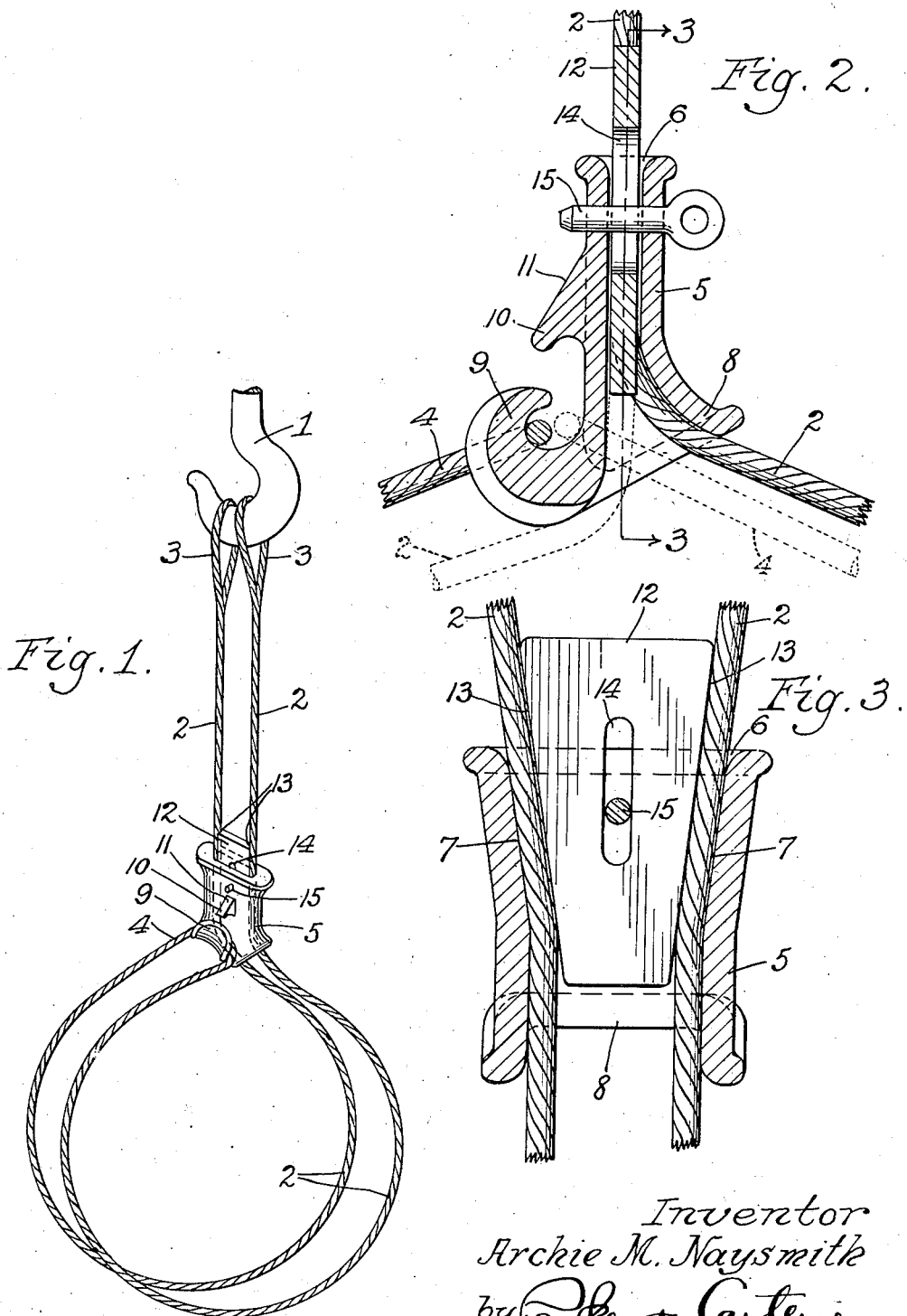

2,080,148

UNITED STATES PATENT OFFICE 2,080,148

CHOKER HOOK

Archie M. Naysmith, Kenosha, Wis., assignor to Macwhyte Company, Kenosha, Wis., a corporation of Wisconsin Application October 7, 1935, Serial No. 43,889

16 Claims. (Cl. 294—74)

This invention relates to a hitch for raising, carrying and for retaining loads of material and comprises a sling and choker hook which form together a unit assembly. The sling may be formed of wire rope, or of rope of any other material, braided rope, a braided sling or of any other desired sling material, and is not limited to the particular design of sling shown in the accompanying drawing.

The invention further relates to a choker for rope slings and in the form here illustrated comprises a so-called choker hook for use with rope slings. Rope slings are frequently used in the handling and temporary storage of material. Frequently slings are positioned about quantities of pipe, rods, piles or the like to assist in moving, handling or loading them. The material so engaged by the sling may be loaded and stored with the sling remaining in place and it is desirable therefore to have means for locking the sling in place about the load so that even when the load is put down and the slings are no longer engaged by a hook or other means for putting tension on the sling as a whole, the load retains its shape and is not spilled or flattened out so that it is readily available for picking up when it is desired to move it again.

Other purposes and advantages of the invention are pointed out below.

The sling as shown comprises a bight or loop of rope only, which is unencumbered by fittings of any kind. Heretofore the bight or loop has had fittings at its end for attachment to the sling or the collar and it is one of the objects of the present invention to avoid the necessity of such fittings. Universally heretofore choker hitches have required fittings on the rope greater in size than the diameter of the rope itself and when it is desired to remove the sling from the load ordinarily the sling is merely pulled from under the load after being unhitched. Where such larger fittings are used, it is difficult because of their increased size with respect to the diameter of the rope to remove the sling from under the load. The present invention, since it makes it possible to make a choker hitch directly on the bight or loop of the sling itself and without the necessity of any added fittings beyond the choker, avoids the disadvantage just mentioned, which is inherent in the fittings, chokers and hitches heretofore used.

It is, therefore, one of the objects of the invention to provide a choker by means of which a simple loop or bight of the sling may be adequately fastened during hoisting; may be locked in place when hoisting is not taking place and may be readily removed as a whole when it is desired to remove the sling from the load.

Another object of the invention is to provide a choker by means of which a suitable hitch is made with the bight or loop of the rope rather than with the end of the rope.

Another object of the invention is to provide in connection with a choker hitch a locking device which comprises a wedge member, which wedge member, when the load is set down, is automatically tightened and retained in locking position by the tendency of the load to spread and so to draw the rope through the choker. When the load is picked up again the tendency of the load to spread is reduced, the rope is to some degree drawn upwardly through the choker and the wedge is thus automatically carried out of locking position by this movement of the rope; and it is an object of the invention to provide the automatic action of the wedge, both in locking and releasing, just described.

Other objects will appear from time to time in the specification and claims.

The invention is more or less diagrammatically illustrated in the accompanying drawing, wherein:—

Figure 1 is an elevational view showing the rope in position about a load and secured to a hook for raising. The load itself has been omitted to avoid confusion, but the loop formed by the sling is positioned about a load.

Figure 2 is a transverse vertical section on an enlarged scale, showing the choker of Figure 1 with the rope sling in position.

Figure 3 is a section taken at line 3—3 of Figure 2.

Like parts are designated by like characters throughout the specification and drawing.

I is a hook member engaging the sling for raising it.

The sling is formed of a rope 2, preferably having loops or eyes 3, 3, one at each end. The rope 2 may also be of grommet or endless construction, in which case no loops or eyes such as the eye 3 will be formed. The sling is doubled to provide a bight or loop 4. This bight or loop is passed through a choker, about the load and secured to the choker hook.

The choker comprises a hollow body 5, which may be provided with a cavity 6, which in the form here shown is generally flat in one direction and is provided with tapering walls 7, 7, so that it is narrower at its bottom than at its top. At one side, for example, on the right hand side as shown in Figure 2, the body 5 is at its lower end flared outwardly as at 8 and is curved as shown to provide a surface against which the rope 2 may bear in passing about the load. On the side opposite the flared portion 8 is an inwardly and upwardly facing hook 9, above which may be positioned a hook or catch 10. It is provided with an inclined upper surface 11 which projects downwardly toward the hook 9. As shown in full lines in Figure 2, the bight or loop 4 is engaged upon the hook 9 when the sling is in position about a load, whether in storage or movement. As shown in dotted lines in Figure 2, the bight or loop 4, instead of being engaged on the hook 9, bears against the body of the choker and extends to the right as shown in Figure 2, while the portion or portions 2 of the sling extend to the left, bearing and curving against the lower portion of the choker. It will be understood that either arrangement of the sling is possible.

A tapered wedge 12 of any suitable material and conforming generally to the shape of the cavity within the body 5 but slightly smaller than that cavity, is positioned within the cavity. The edges 13 of the wedge 12 may or may not be concave to conform to the shape of the rope which they engage.

The wedge 12 may be a temporary member driven into place when it is desired and removed when not desired, or it may be movably attached to the choker to form in effect a units with it, and whether it is permanently attached to the choker or not, it may be slotted as at 14 to engage a pin 15, passing through suitable perforations in the body 5. If the slot and the pin arrangement are used, the slot will be of such length that the wedge may be moved to the locking and to the unlocking position without removal of the pin.

It will be realized that whereas I have herewith shown and described a practical operative device, nevertheless many changes might be made in the size, shape, number and disposition of parts without departing from the spirit of the invention and I wish, therefore, that my showing and description be taken as in a sense diagrammatic.

In particular the invention is not limited to any special or individual type of sling and the choker hook may be used with any desired sling. It may, for example, be used with a grommet sling, as above mentioned, or a sling with eyes at its ends as shown, and the arrangement of the sling with the choker may be varied in a number of ways. Thus they may be connected as shown in full lines in Figure 2, or as shown in dotted lines in that figure, or otherwise.

The use and operation of the invention are as follows:

When it is desired to use a rope sling and to avoid the disadvantages of the necessity of fastening the end of the sling to a choker or collar and when it is desirable to avoid the necessity of positioning fastening means upon the ends of the rope, the hitch and choker collar of the present invention are used.

In the form shown, a rope sling provided with eyes is used and these eyes may, at option, be engaged upon a hook or other lifting, supporting or conveying means, and the remainder of the sling hangs as a double strand of rope and is looped or shaped into a bight, is passed through the opening in the body 5, then passed about the load and engaged upon the hook 9.

This attachment and this use of the bight or loop of the sling provide a means in which that part of the sling which is passed under the load has no attachments or fittings of greater diameter than that of the rope itself. Therefore, it may be readily moved under the load and readily withdrawn from it. This arrangement is important particularly for withdrawal because there are no parts on the sling to catch upon the load and to cause damage either to the sling itself or to any part of the load.

When the sling is in position about the load and the bight of the sling is engaged upon the hook 9, if now the wedge 12 is in position and the load is raised, the tension on the portions 2 of the sling is such that they tend to move slightly out of the choker and by friction the wedge is actually withdrawn from locking contact or tends to be so withdrawn and can be moved out of locking position readily if desired.

When the load is set down so that tension is removed from the portions 2 of the sling which are between the choker and the hook 1, the load tends to flatten out or spread and so draws the sling again and so tends to move the sling through the choker. When this occurs the wedge, by the friction of the sling, is pulled into the choker, wedged into place and locks the sling against further movement and so holds the load not only together but in shape, preventing substantial settling or flattening.

The choker of this invention therefore provides both means for using the bight of the sling to avoid the necessity of enlarged attachment fittings and it provides automatic means for unlocking the sling in the choker when the load is raised and for locking it in the choker when the load is set down.

I claim:

1. A choker hook comprising a body formed with a cavity, said cavity having an inclined surface, a main hook formed integrally with said body, a guard hook formed integrally with said body and facing said main hook, a wedge positioned within said cavity and mounted upon said body for limited relative movement with respect thereto.

2. A choker hook comprising a body formed with a cavity, said cavity having an inclined surface, a main hook formed integrally with said body, a guard hook formed integrally with said body and facing said main hook, a wedge positioned within said cavity, shaped generally to conform thereto and mounted upon said body for limited relative movement with respect thereto.

3. A choker hook comprising a body formed with a cavity, said cavity having an inclined surface, a main hook formed integrally with said body, a guard hook formed integrally with said body and facing said main hook, a wedge positioned within said cavity and mounted upon said body for limited relative movement with respect thereto, said wedge adapted to engage a rope within the cavity and to lock the same to the choker.

4. A choker hook comprising a body formed with a cavity, said cavity having an inclined surface, a main hook formed integrally with said body, a guard hook formed integrally with said body and facing said main hook, a wedge positioned within said cavity, shaped generally to conform thereto and mounted upon said body for limited relative movement with respect thereto, said wedge adapted to engage a rope within the cavity and to lock the same to the choker.

5. A choker hook for slings, comprising a hollow body, a cavity within said body, and a main upwardly facing hook fixed upon one side of said body, and a co-operating downwardly facing guard hook fixed upon the same side of the choker and adjacent said main hook, and a wedge, said wedge being attached to the choker for limited movement with respect thereto.

6. A choker hook for slings, comprising a hollow body, a generally flat cavity within said body, provided with converging sides, and a main upwardly facing hook fixed upon one side of said body, and a co-operating downwardly facing guard hook fixed upon the same side of the choker and adjacent said main hook, and a wedge, said wedge being attached to the choker for limited movement with respect thereto.

7. A choker hook for slings, comprising a hollow body, a generally flat cavity within said body, provided with converging sides, and a main upwardly facing hook fixed upon one side of said body, and a co-operating downwardly facing guard hook fixed upon the same side of the choker and adjacent said main hook, and a wedge conforming generally in shape to the cavity within said choker, said wedge being attached to the choker for limited movement with respect thereto.

8. A choker hook for slings, comprising a hollow body, a generally flat cavity within said body, provided with converging sides, said cavity being outwardly flared at its upper end and outwardly flared to a greater degree at its lower end, and a main upwardly facing hook positioned adjacent the lower end of the choker upon one side of said body, and a co-operating downwardly facing guard hook positioned upon the same side of the choker and adjacent said main hook, and a wedge conforming generally in shape to the upper portion of said cavity within said choker, said wedge being attached to the choker for limited movement with respect thereto.

9. In combination in a hitch, a sling and a hollow choker, said sling being formed of a rope doubled upon itself to provide a bight, said bight being inserted through said choker, said choker being provided on its exterior with a fixed hook and the bight being engaged upon said hook, the choker provided with a cavity of varying width, a wedge positioned within said cavity and adapted to wedge the rope against movement with respect to the choker.

10. In combination in a hitch, a sling and a hollow choker, said sling being formed of a rope doubled upon itself to provide a bight, said bight being inserted through said choker, said choker being provided on its exterior with a fixed hook and the bight being engaged upon said hook, the choker provided with a cavity of varying width, a wedge positioned within said cavity and adapted to wedge the rope against movement with respect to the choker, said wedge being attached to the choker for limited movement with respect thereto.

11. In combination in a hitch, a rope sling and a hollow choker, said sling being doubled upon itself to form a bight, the bight being inserted through the choker, the choker being provided with a fixed hook upon which the bight is engaged, the choker shaped with an internal cavity of varying diameter, and a wedge positioned within said cavity and between the sling members and adapted to wedge them against the choker to prevent relative movement.

12. In combination in a hitch, a rope sling and a hollow choker, said sling being doubled upon itself to form a bight, the bight being inserted through the choker, the choker being provided with a fixed hook upon which the bight is engaged, the choker shaped with an internal cavity of varying diameter, and a wedge positioned within said cavity and between the sling members and adapted to wedge them against the choker to prevent relative movement, the wedge being attached to the choker for limited relative movement with respect thereto.

13. In combination in a hitch, a sling and a hollow choker, the sling being looped upon itself to form a bight, the bight being inserted through the choker, a hook fixed to the exterior of said choker, the bight being engaged thereon, the choker having a cavity of varying width, and a wedge positioned within the cavity and within the loop and in contact simultaneously with both sides of the loop, and adapted in all positions to contact the sling, the sling, when the load is raised, being effective to withdraw the wedge from the choker and when the load is deposited being effective to draw it into the choker to cause locking.

14. In combination in a hitch, a sling and a hollow choker, the sling being looped upon itself to form a bight, the bight being inserted through the choker, a hook fixed to the exterior of said choker, the bight being engaged thereon, there being a wedge within the choker in contact with the sling, said wedge, when the load is deposited, being moved by the sling to lock the latter against the choker, and when the load is raised, being moved to free the sling from locking engagement with the choker.

15. A choker hook comprising a body formed with a cavity, said cavity having an inclined surface, a hook formed integrally with the body, a portion of the body shaped to face and partially overhang said hook, a wedge positioned within said cavity and carried by said body for limited relative movement with respect thereto.

16. A choker hook comprising a body formed with a cavity having an inclined surface, a hook formed integrally with said body, a wedge positioned within said cavity and supported upon said body for limited relative movement with respect thereto.

ARCHIE M. NAYSMITH.